United States Patent
Ogushi et al.

(10) Patent No.: US 9,038,757 B2
(45) Date of Patent: May 26, 2015

(54) VEHICLE BATTERY MOUNTING STRUCTURE

(71) Applicants: Hisaya Ogushi, Yokohama (JP); Yoshihito Terao, Fukui (JP)

(72) Inventors: Hisaya Ogushi, Yokohama (JP); Yoshihito Terao, Fukui (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/361,039

(22) PCT Filed: Nov. 12, 2012

(86) PCT No.: PCT/IB2012/002610
§ 371 (c)(1),
(2) Date: May 28, 2014

(87) PCT Pub. No.: WO2013/080033
PCT Pub. Date: Jun. 6, 2013

(65) Prior Publication Data
US 2014/0326524 A1   Nov. 6, 2014

(30) Foreign Application Priority Data

Nov. 29, 2011   (JP) .................................. 2011-260998

(51) Int. Cl.
| | | |
|---|---|---|
| *B60R 16/04* | (2006.01) | |
| *B60K 1/04* | (2006.01) | |
| *H01M 2/10* | (2006.01) | |

(52) U.S. Cl.
CPC ............... *B60K 1/04* (2013.01); *Y02T 10/7077* (2013.01); *Y02T 90/14* (2013.01); *B60R 16/04* (2013.01); *B60K 2001/0422* (2013.01); *B60K 2001/0438* (2013.01); *H01M 2/1083* (2013.01); *H01M 2220/20* (2013.01)

(58) Field of Classification Search
CPC .. B60R 16/04; B60K 1/04; B60K 2001/0422; B60K 2001/0438; H01M 2/1083; H01M 2220/20; Y02T 90/14; Y02T 10/7077
USPC .................... 180/65.1, 65.21, 68.5
See application file for complete search history.

(56) References Cited

U.S. PATENT DOCUMENTS

| | | | | |
|---|---|---|---|---|
| 7,654,352 | B2 * | 2/2010 | Takasaki et al. ............. | 180/68.5 |
| 8,006,793 | B2 * | 8/2011 | Heichal et al. ............... | 180/68.5 |
| 8,464,817 | B2 * | 6/2013 | Usami et al. ................. | 180/68.5 |
| 8,643,224 | B2 * | 2/2014 | Kim ............................. | 307/326 |
| 8,727,416 | B2 * | 5/2014 | Nakazawa ................. | 296/37.16 |
| 8,733,487 | B2 * | 5/2014 | Usami et al. ................. | 180/68.5 |
| 8,789,634 | B2 * | 7/2014 | Nitawaki ..................... | 180/68.5 |

(Continued)

FOREIGN PATENT DOCUMENTS

| | | |
|---|---|---|
| JP | H06-344950 A | 12/1994 |
| JP | A-9-226483 | 9/1997 |

(Continued)

*Primary Examiner* — Hau Phan
*Assistant Examiner* — Jacob Meyer
(74) *Attorney, Agent, or Firm* — Oliff PLC (57) ABSTRACT

A vehicle battery mounting structure having a service hole cover that closes a service hole the service hole cover includes a rear cover that covers a rear end side of the service hole in a vehicle longitudinal direction and a front cover that covers a front end side of the service hole in the vehicle longitudinal direction. That is, the service hole cover is split into the rear cover and the front cover in the vehicle longitudinal direction. The front cover is detachably attached to a floor upper reinforcement provided on a floor panel by bolts.

8 Claims, 5 Drawing Sheets

(56) References Cited

U.S. PATENT DOCUMENTS

| | | | |
|---|---|---|---|
| 8,910,737 B2* | 12/2014 | Saeki | 180/68.5 |
| 8,915,749 B2* | 12/2014 | Ikeda et al. | 439/157 |
| 2004/0217630 A1 | 11/2004 | Takeuchi et al. | |
| 2008/0196957 A1* | 8/2008 | Koike et al. | 180/68.5 |
| 2009/0152034 A1* | 6/2009 | Takasaki et al. | 180/68.5 |
| 2009/0197154 A1* | 8/2009 | Takasaki et al. | 429/83 |
| 2009/0197456 A1* | 8/2009 | Kawai et al. | 439/465 |
| 2009/0236162 A1* | 9/2009 | Takasaki et al. | 180/68.5 |
| 2009/0242299 A1* | 10/2009 | Takasaki et al. | 180/68.5 |
| 2011/0297469 A1* | 12/2011 | Usami et al. | 180/68.5 |
| 2012/0018238 A1* | 1/2012 | Mizoguchi et al. | 180/68.5 |
| 2012/0055725 A1* | 3/2012 | Mizoguchi et al. | 180/68.5 |
| 2012/0097466 A1* | 4/2012 | Usami et al. | 180/68.5 |
| 2012/0160584 A1* | 6/2012 | Nitawaki | 180/68.5 |
| 2013/0037336 A1* | 2/2013 | Ojeda et al. | 180/68.5 |
| 2013/0127200 A1* | 5/2013 | Saeki | 296/37.14 |

FOREIGN PATENT DOCUMENTS

| | | |
|---|---|---|
| JP | A-2001-138753 | 5/2001 |
| JP | A-2003-341373 | 12/2003 |
| JP | 2004-306911 A | 11/2004 |
| JP | A-2009-83601 | 4/2009 |
| JP | A-2009-181895 | 8/2009 |
| JP | A-2013-23163 | 2/2013 |
| JP | A-2013-107542 | 6/2013 |

* cited by examiner

VEHICLE BATTERY MOUNTING STRUCTURE

BACKGROUND OF THE INVENTION

1. Field of the Invention

The invention relates to a vehicle battery mounting structure.

2. Description of Related Art

Japanese Patent Application Publication No. 2009-083601 (JP 2009-083601 A) describes an electric vehicle on which a battery unit having a service plug is mounted below a floor panel. The floor panel of the electric vehicle described in JP 2009-083601 A has a boot mounting hole for operating the service plug, and a cap member that closes the boot mounting hole is fastened by bolts. These boot mounting hole and cap member are located below a front seat.

In addition, Japanese Patent Application Publication No. 2003-341373 (JP 2003-341373 A) describes a power supply unit mounting structure that a power supply unit having a service plug is mounted between a floor panel and a seated portion of a front seat. In the power supply unit mounting structure described in JP 2003-341373 A, a lid that covers the service plug is attached to the rear wall of the power supply unit, and the front seat is slidable forward in a vehicle longitudinal direction to a position at which the lid is exposed.

However, in the electric vehicle described in JP 2009-083601 A, the boot mounting hole and the cap member are located below the front seat as described above, so, when a worker operates the service plug, it is required to, for example remove the cap member in a narrow space between the floor panel and the front seat, resulting in poor workability.

To take measures against this situation, it is conceivable to make the front seat slidable in the vehicle longitudinal direction to the position at which the cap member is exposed as in the case of the power supply unit mounting structure described in JP 2003-341373 A. However, in order to expose the whole of the cap member, the amount of slide of the front seat may be large.

SUMMARY OF THE INVENTION

The invention provides a vehicle battery mounting structure, which is able to reduce the amount of slide of a vehicle seat while improving workability of work for removing a service hole cover.

An aspect of the invention provides a vehicle battery mounting structure. The vehicle battery mounting structure includes: a vehicle floor that supports a vehicle seat such that the vehicle seat is slidable in a vehicle longitudinal direction and in which a service hole is formed at a portion over which a seat cushion of the vehicle seat is located when the vehicle seat is located at a center in a sliding direction; a battery unit that is arranged below the vehicle floor in a vehicle vertical direction and that has an operating portion protruding toward the service hole; and a service hole cover that closes the service hole, and that includes a first cover that is provided on an upper face of the vehicle floor and that covers one end side of the service hole in the vehicle longitudinal direction and a second cover that is detachably attached to the upper face of the vehicle floor and that covers the other end side of the service hole in the vehicle longitudinal direction.

With the vehicle battery mounting structure according to the above aspect, the service hole cover that covers the service hole includes the first cover that covers one end side of the service hole in the vehicle longitudinal direction and the second cover that covers the other end side of the service hole in the vehicle longitudinal direction, and the second cover is detachably attached to the vehicle floor. Thus, by sliding the vehicle seat toward one end side (side opposite to the second cover) of the service hole cover in the vehicle longitudinal direction to expose the second cover, in comparison with the case where the second cover is not exposed, it is possible to easily remove the second cover from the vehicle floor. Thus, workability of work for removing the second cover improves.

In addition, by removing the second cover from the vehicle floor, it is possible to open the service hole in a state where the seat cushion of the vehicle seat is located over the first cover, that is, in a state where the first cover is located below the seat cushion. Thus, in comparison with the case where the first cover and the second cover are exposed, it is possible to reduce the amount of slide of the service hole cover of the vehicle seat toward one end side in the vehicle longitudinal direction.

With the vehicle battery mounting structure according to the above aspect, it is possible to reduce the amount of slide of the service hole cover of the vehicle seat toward one end side in the vehicle longitudinal direction while improving workability of work for removing the second cover.

In the vehicle battery mounting structure according to the above aspect, the service hole cover may include an insertion portion that is provided at one of the first cover and the second cover and a connecting portion that is provided at the other one of the first cover and the second cover, that is inserted in the insertion portion removably in the vehicle longitudinal direction and that connects the first cover to the second cover.

With the vehicle battery mounting structure according to the above aspect, by moving the second cover toward one end side of the service hole cover in the vehicle longitudinal direction with respect to the first cover provided on the vehicle floor to thereby insert the connecting portion provided at the other one of the first cover and the second cover to the insertion portion provided at the one of the first cover and the second cover, the first cover and the second cover are connected to each other. By so doing, a positional deviation between the first cover and the second cover is suppressed.

On the other hand, by moving the second cover toward the other end side of the service hole cover in the vehicle longitudinal direction with respect to the first cover to pull out the connecting portion from the insertion portion, connection between the first cover and the second cover is released. Thus, for example, in comparison with the configuration that the first cover and the second cover are fastened to each other by a bolt, or the like, it is possible to easily remove the second cover from the vehicle floor while suppressing a positional deviation between the first cover and the second cover.

In the vehicle battery mounting structure according to the above aspect, the insertion portion may have an insertion port to which the connecting portion is inserted, and the one of the first cover and the second cover, having the insertion portion, may have a guide portion that guides the connecting portion to the insertion port.

With the vehicle battery mounting structure according to the above aspect, by providing the guide portion for one of the first cover and the second cover, in comparison with the configuration having no guide portion, it is possible to easily insert the connecting portion to the insertion portion. Thus, for example, in comparison with the configuration that the first cover and the second cover are fastened to each other by a bolt, or the like, workability of work for connecting the first cover and the second cover to each other improves.

In the vehicle battery mounting structure according to the above aspect, the operating portion may be arranged above the vehicle floor through the service hole in a vehicle vertical direction.

With the vehicle battery mounting structure according to the above aspect, the operating portion is arranged above the vehicle floor in the vehicle vertical direction, so, when the second cover is removed from the vehicle floor, the operating portion is exposed above the vehicle floor. Thus, in comparison with the configuration that the operating portion is arranged below, the vehicle floor in the vehicle vertical direction, it is easy to operate the operating portion.

In the vehicle battery mounting structure according to the above aspect, the battery unit may include a battery module that stores electric power and a battery case that accommodates the battery module and in which the operating portion is provided at a top wall portion, and a seal member that closes a gap between the vehicle floor and the top wall portion of the battery case may be provided in the gap so as to surround the service hole.

With the vehicle battery mounting structure according to the above aspect, the seal member is provided in the gap between the vehicle floor and the top wall portion of the battery case so as to surround the service hole. By closing the gap between the vehicle floor and the top wall portion of the battery case with the seal member, entry of rain water, or the like, toward the service hole side is suppressed. Thus, a failure, or the like, of the operating portion is suppressed.

In the vehicle battery mounting structure according to the above aspect, the top wall portion of the battery case may have a base portion that protrudes above the vehicle floor in the vehicle vertical direction with respect to the vehicle floor through the service hole and that supports the operating portion, and the seal member may be arranged radially outward of the base portion so as to be spaced apart from the base portion.

With the vehicle battery mounting structure according to the above aspect, the seal member is arranged radially outward of the base portion so as to be spaced apart from the base portion, even if rain water, or the like, enters onto the vehicle floor (into the vehicle cabin), rain water, or the like, flows into between the base portion and the seal member, so the operating portion is prevented from being immersed in rain water, or the like. Thus, a failure, or the like, of the operating portion is suppressed.

In the vehicle battery mounting structure according to the above aspect, the seal member may extend from the top wall portion of the battery case toward the vehicle floor and is curved such that a distal end portion of the seal member in a direction in which the seal member extends is oriented toward a side opposite to the service hole.

With the vehicle battery mounting structure according to the above aspect, the distal end portion of the seal member in the direction in which the seal member extends is curved so as to be oriented toward a side opposite to the service hole. By so doing, in comparison with the configuration that the distal end portion of the seal member in the direction in which the seal member extends is not curved, it is possible to increase the capacity of rain water, or the like, stored between the base portion and the seal member while suppressing entry of rain water, or the like, toward the service hole side through the gap between the vehicle floor and the top wall portion of the battery case. Thus, a failure, or the like, of the operating portion is further suppressed.

As described above, with the vehicle battery mounting structure according to the aspect of the invention, it is possible to reduce the amount of slide of the vehicle seat while improving workability of work for removing the service hole cover.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4A and FIG. 4B are plan views for illustrating a method of attaching a front cover that constitutes the service hole cover according to the embodiment of the invention to a floor panel, in which FIG. 4A shows a state before the front cover is attached to the floor panel and FIG. 4B shows a state where the front cover is attached to the floor panel.

DETAILED DESCRIPTION OF EMBODIMENTS

Hereinafter, a vehicle battery mounting structure according to an embodiment of the invention will be described with reference to the accompanying drawings. Note that an arrow FR shown in the drawing as needed indicates a front side (vehicle front side) in a vehicle longitudinal direction, an arrow UP indicates an upper side in a vehicle vertical direction, and an arrow OUT indicates an outer side in a vehicle width direction.

Figure 1:
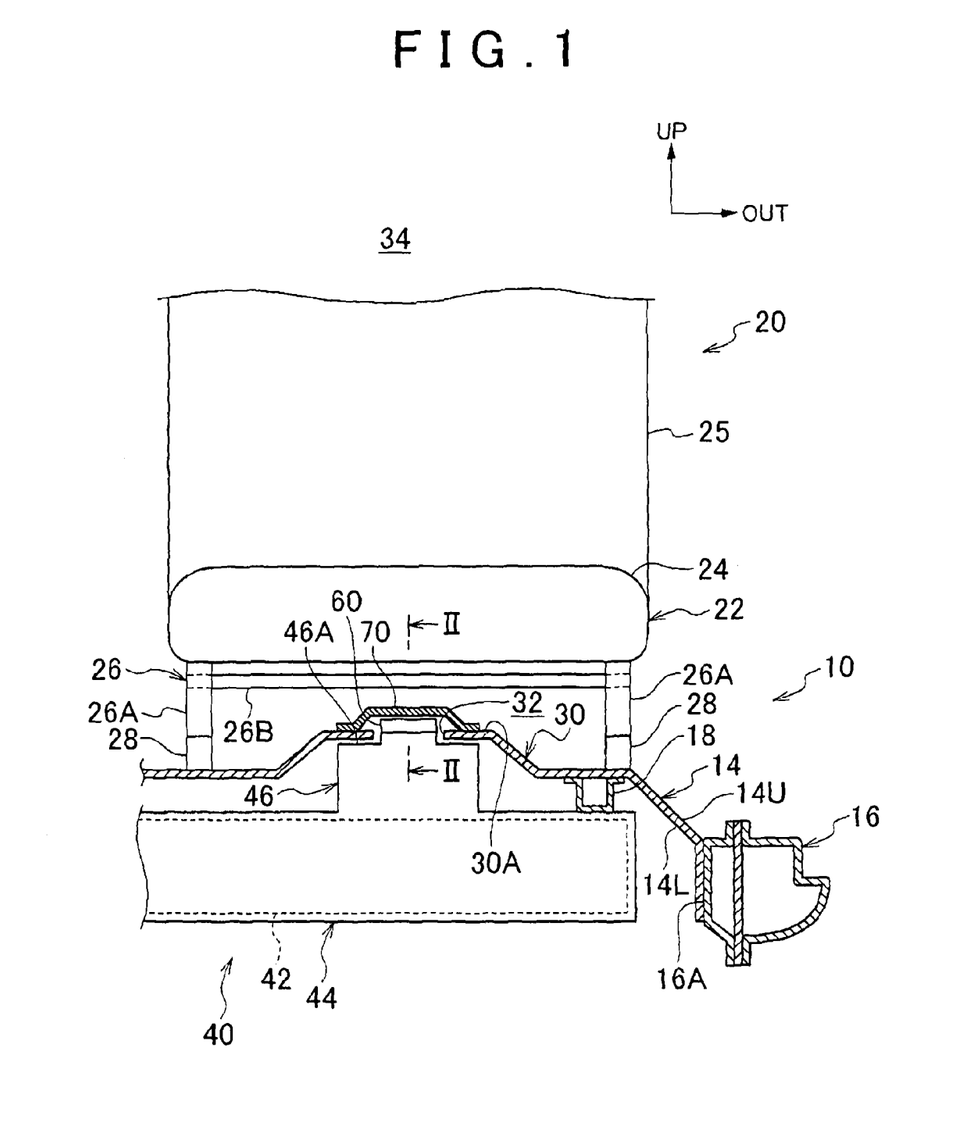
FIG. 1 is a lateral cross-sectional view when a vehicle to which a vehicle battery mounting structure according to an embodiment of the invention is applied is viewed from a front side in a vehicle longitudinal direction.

FIG. 1 shows a lateral cross-sectional view when a vehicle 12 to which the vehicle battery mounting structure 10 according to the present embodiment is applied is viewed from the front side in the vehicle longitudinal direction. The vehicle 12 may be, for example, an electric vehicle, a gasoline hybrid vehicle, a fuel cell hybrid vehicle, or the like, that is able to travel with the use of an electric motor (motor) (not shown) as a driving source. A battery unit 40 is mounted below a floor panel 14 in the vehicle vertical direction. The floor panel 14 constitutes a vehicle floor of the vehicle 12. The battery unit 40 stores electric power to be supplied to the electric motor.

As shown in FIG. 1, a rocker 16 is arranged at one end side (vehicle body left side) of the floor panel 14 in the vehicle width direction. The rocker 16 constitutes the frame of a vehicle body lower portion. The rocker 16 extends in the vehicle longitudinal direction and has a closed cross-sectional structure. The one end portion of the floor panel 14 in the vehicle width direction is connected to an inner wall surface 16A inside the rocker 16 in the vehicle width direction. In addition, a floor side member 18 is provided on a lower face 14L of the floor panel 14, adjacent to the rocker 16. The floor side member 18 reinforces the floor panel 14. The floor side member 18 extends in the vehicle longitudinal direction and is formed in a hat shape in cross section such that a side adjacent to the floor panel 14 is open. By connecting the floor side member 18 to the floor panel 14, a closed cross-sectional structure is formed of these floor side member 18 and floor panel 14. Although not shown in the drawing, a rocker and a floor side member (not shown) are provided at the other end side (vehicle body right side) of the floor panel 14 in the vehicle width direction. The rocker and the floor side member are respectively paired with the rocker 16 and the floor side member 18.

A front seat 20 is arranged above the floor panel 14 in the vehicle vertical direction. The front seat 20 serves as a vehicle seat that constitutes a front passenger seat. The front seat 20 includes a seat cushion 22 and a seat back 25. The seat cushion 22 supports the buttocks and thighs of a seated passenger (not shown). The seat back 25 is inclinably supported at the rear end portion of the seat cushion 22 in the vehicle longitudinal direction, and supports the back of the passenger.

The seat cushion 22 is formed of a cushion material 24 and a seat cushion frame 26. The cushion material 24 is covered with a seat skin (not shown). The seat cushion frame 26 supports the cushion material 24. Note that, in FIG. 1, the seat cushion 22 is shown in a state where the lower portion of the cushion material 24 is cut away. The seat cushion frame 26 includes a pair of side frames 26A and a seat pipe 26B. The pair of side frames 26A extend in the vehicle longitudinal direction. The seat pipe 26B couples these side frames 26A in the vehicle width direction.

The pair of side frames 26A are supported by the floor panel 14 via a pair of seat rails 28. The pair of seat rails 28 are fixed to an upper face 14U of the floor panel 14. The seat rails 28 extend in the vehicle longitudinal direction, and respectively support the lower end portions of the side frames 26A such that the side frames 26A are slidable in the vehicle longitudinal direction. By so doing, the front seat 20 is slidable in the vehicle longitudinal direction with respect to the floor panel 14. Note that a lock mechanism (not shown) that restricts a slide of the side frames 26A in the vehicle longitudinal direction with respect to the seat rails 28 is provided for the side frames 26A and the seat rails 28, the positions of the side frames 26A in the vehicle longitudinal direction with respect to the floor panel 14 are adjustable by the lock mechanism.

A projecting portion 30 is provided at the floor panel 14 that supports the front seat 20. The projecting portion 30 projects upward in the vehicle vertical direction from a major portion (reference surface) of the floor panel 14 in a projecting shape, and a service hole 32 is formed at a top wall portion 30A of the projecting portion 30. The service hole 32 is arranged at a position at which the seat cushion 22 of the front seat 20 is located over the service hole 32 in plan view in a state where the front seat 20 is located at the center in a slide direction. That is, the service hole 32 is formed at a portion of the floor panel 14, over which the seat cushion 22 of the front seat 20 is located when the front seat 20 is located at the center in the slide direction. Note that a state where the front seat 20 is located at the center in the slide direction means a state where the front seat 20 is located at a position other than a frontmost side in the vehicle longitudinal direction and a rearmost side in the vehicle longitudinal direction, and is not limited to a state where the front seat 20 is located at a middle position between the frontmost position of the front seat 20 in the vehicle longitudinal direction and the rearmost position of the front seat 20 in the vehicle longitudinal direction. Thus, the service hole 32 is appropriately formed at a portion of the floor panel 14, over which the seat cushion 22 of the front seat 20 is located, when the front seat 20 is located at a predetermined position other than the frontmost side in the vehicle longitudinal direction and the rearmost side in the vehicle longitudinal direction. The service hole 32 is closed by a service hole cover 70 (described later) from above in the vehicle vertical direction.

The battery unit 40 is arranged below the floor panel 14 in the vehicle vertical direction. The battery unit 40 includes a battery module 42, a battery case 44 and an electric circuit interrupting device 60. The battery case 44 accommodates the battery module 42. The electric circuit interrupting device 60 is provided on the upper portion of the battery case 44. The battery unit 40 is connected to a frame member via a coupling member (not shown). The frame member constitutes the frame of the vehicle body lower portion. The battery module 42 is a storage battery that stores electric power to be supplied to the above-described electric motor (not shown), and is accommodated in the battery case 44. Note that, in FIG. 1, the battery module 42, the battery case 44 and the electric circuit interrupting device 60 are schematically shown.

Figure 2:
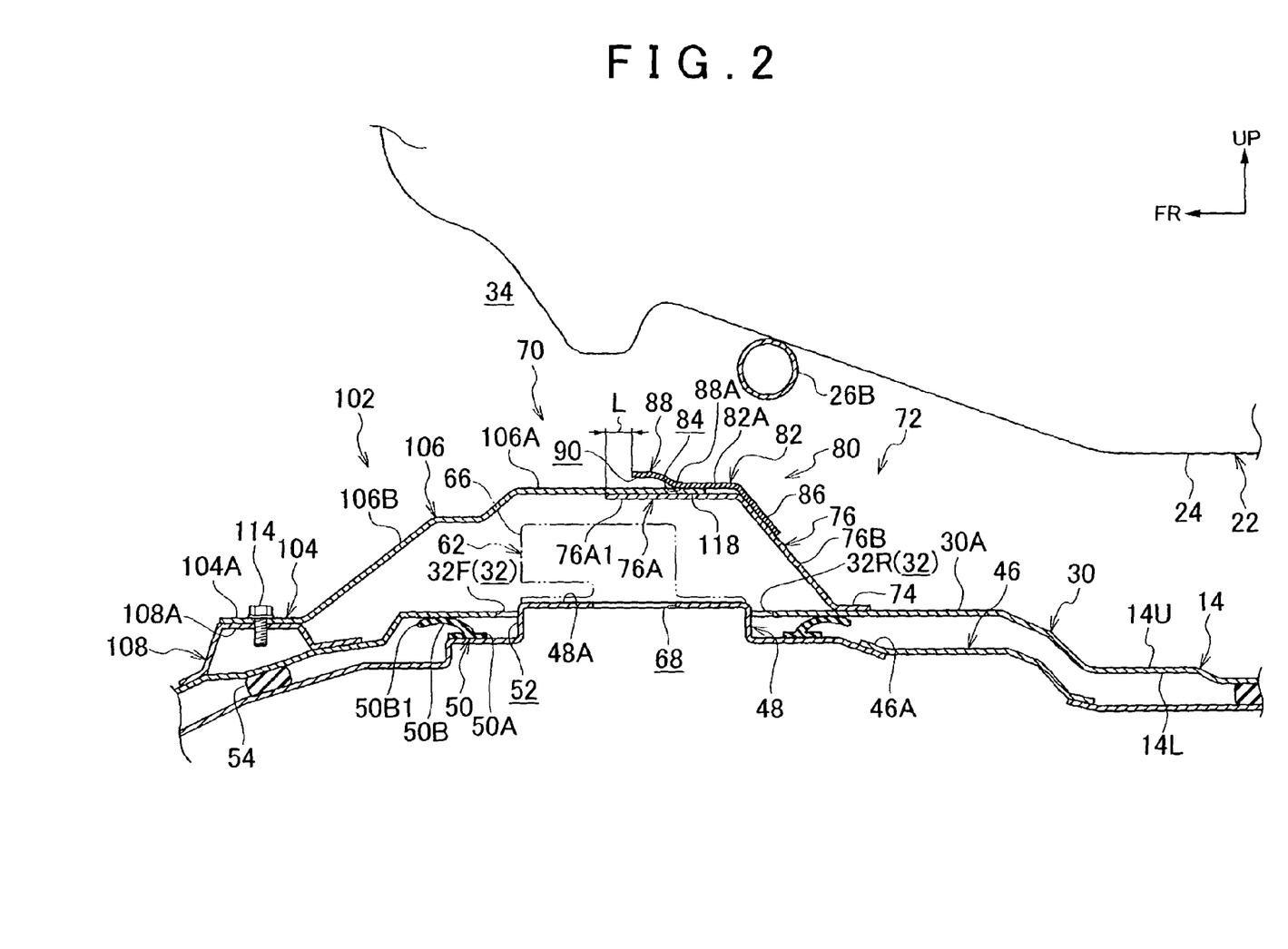
FIG. 2 is a cross-sectional view taken along the line II-II in FIG. 1.

A protruding portion 46 is provided at the one end side (rocker 16 side) on the upper portion of the battery case 44 in the vehicle width direction. The protruding portion 46 protrudes upward in the vehicle vertical direction. As shown in FIG. 2, a base portion 48 is provided at a top wall portion 46A of the protruding portion 46. The base portion 48 supports the electric circuit interrupting device 60. The base portion 48 is formed by raising the top wall portion 46A of the protruding portion 46 upward in the vehicle vertical direction. The top wall portion 48A of the base portion 48 is located on a vehicle cabin 34 side with respect to the floor panel 14 through the service hole 32. The electric circuit interrupting device 60 is mounted on the top wall portion 48A.

In addition, a ring-shaped inner weather strip 50 is provided radially outward of the base portion 48. The inner weather strip 50 serves as a seal member, and closes a gap between the top wall portion 46A of the protruding portion 46 and the floor panel 14. The inner weather strip 50 is formed in an inverted T shape in cross section, and includes a fixing portion 50A and an extending portion 50B. The fixing portion 50A is fixed to the top wall portion 46A of the protruding portion 46 by an adhesive, or the like. The extending portion 50B extends from the fixing portion 50A toward the floor panel 14 (upward in the vehicle vertical direction), and is in contact with the lower face 14L of the floor panel 14. The inner weather strip 50 is provided in the gap between the top wall portion 46A of the protruding portion 46 and the floor panel 14 so as to surround the service hole 32. Entry of rain water, or the like, toward the base portion 48 and the service hole 32 through the gap between the top wall portion 46A of the protruding portion 46 and the floor panel 14 is suppressed by the inner weather strip 50.

In addition, the inner weather strip 50 is arranged so as to be spaced apart from the base portion 48, and a reservoir space 52 for storing rain water, or the like, is formed between the base portion 48 and the inner weather strip 50. Furthermore, the extending portion 50B is in contact with the lower face 14L of the floor panel 14 in a state where the extending portion 50B is curved such that a distal end portion 50B1 of the extending portion 50B in its extending direction is oriented radially outward of the inner weather strip 50, that is, toward a side opposite to the service hole 32. By so doing, in comparison with a configuration that the extending portion 50B is not curved, the reservoir space 52 is wide.

Furthermore, an outer weather strip 54 is provided radially outward of the inner weather strip 50 so as to surround the inner weather strip 50. The gap between the top wall portion 46A of the protruding portion 46 and the floor panel 14 is closed by the outer weather strip 54. That is, in the present embodiment, a double-seal structure is formed of the inner weather strip 50 and the outer weather strip 54.

Figure 3:
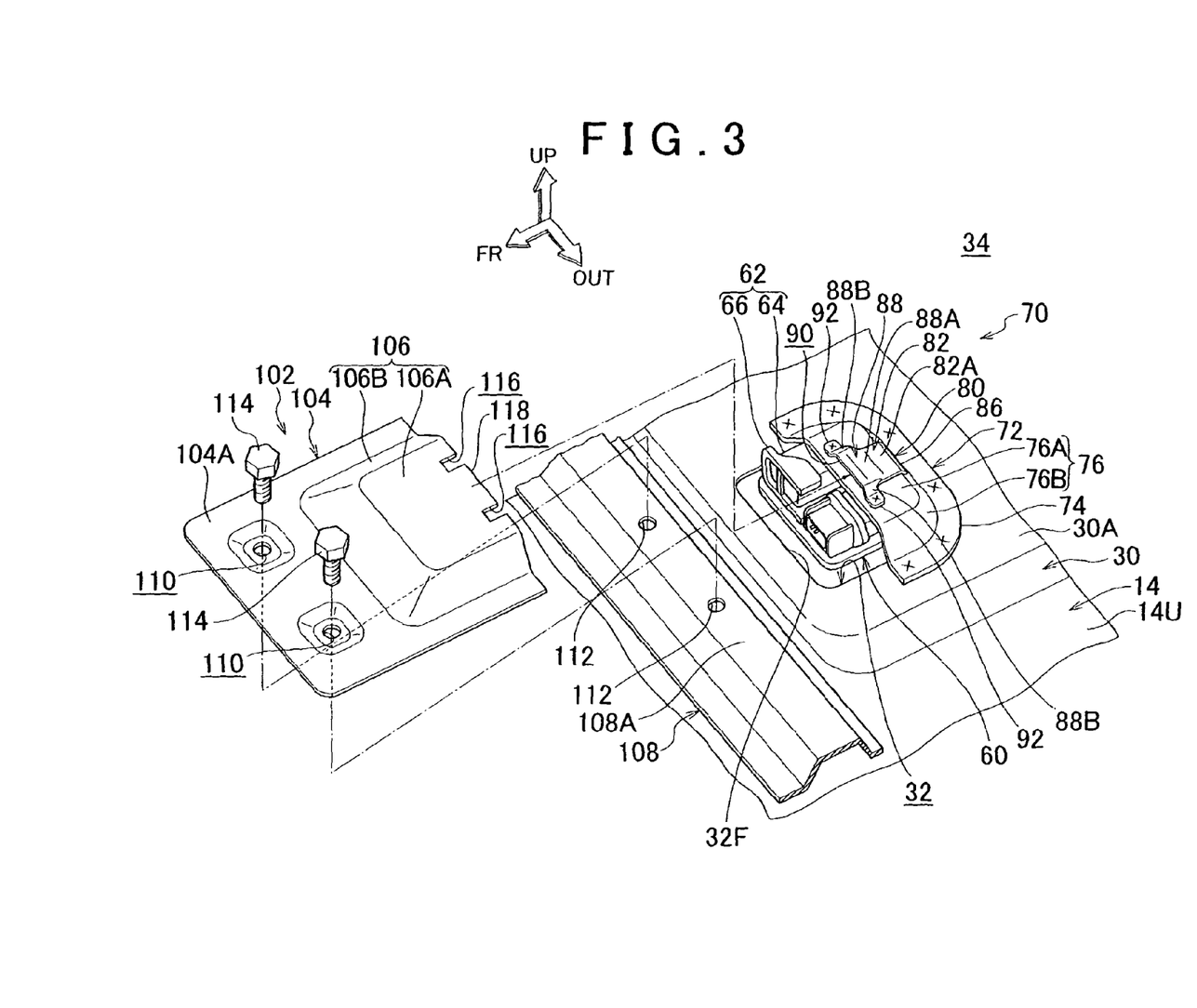
FIG. 3 is an exploded perspective view that shows a service hole cover according to the embodiment of the invention.

The electric circuit interrupting device 60, which is mounted on the top wall portion 48A of the base portion 48, is arranged on the upper side (vehicle cabin 34 side) in the vehicle vertical direction with respect to the floor panel 14 through the service hole 32. As shown in FIG. 3, the electric circuit interrupting device 60 includes a service plug 62. The service plug 62 serves as an operating portion for electrically interrupting an electric circuit (not shown) of the battery module 42. The service plug 62 includes a, plug case 64 and an operating lever 66 provided on the plug case 64. A plug terminal (not shown) coupled to the operating lever 66 is accommodated in the plug case 64. In addition, a connection terminal (not shown) is accommodated in the plug case 64. The plug terminal is detachably connected to the connection terminal. The connection terminal is connected to the electric circuit of the battery module 42 (see FIG. 1), accommodated in the battery case 44, through a wiring opening 68 (see FIG. 2) formed in the top wall portion 48A of the base portion 48.

The operating lever 66 is arranged at the front end side of the electric circuit interrupting device 60 in the vehicle longitudinal direction, and is supported at the front end portion of the plug case 64 in the vehicle longitudinal direction via a slide mechanism (not shown) so as to be slidable in the vehicle width direction. As the worker slides the operating lever 66 inward in the vehicle width direction, the plug terminal coupled to the operating lever 66 disengages from the connection terminal. By so doing, the electric circuit of the battery module 42 is electrically interrupted, and electrical connection between the battery module 42 and the above-described electric motor (not shown), or the like, is disconnected.

The thus configured electric circuit interrupting device 60 is covered with the service hole cover 70, which closes the service hole 32, from above in the vehicle vertical direction. The service hole cover 70 includes a rear cover 72 and a front cover 102. The rear cover 72 serves as a first cover and covers a rear end 32R (see FIG. 2) side of the service hole 32 in the vehicle longitudinal direction. The front cover 102 serves as a second cover and covers a front end 32F side of the service hole 32 in the vehicle longitudinal direction. That is, the service hole cover 70 is split into the rear cover 72 and the front cover 102 in the vehicle longitudinal direction. These rear cover 72 and front cover 102 are connected to each other in a state where the rear end portion of the front cover 102 in the vehicle longitudinal direction is superimposed on the front end portion of the rear cover 72 in the vehicle longitudinal direction.

The rear cover 72 includes a flange portion 74 and a rear accommodating portion 76. The flange portion 74 is fixed to an outer peripheral portion around the service hole 32. The rear accommodating portion 76 is swelled upward in the vehicle vertical direction with respect to the flange portion 74, and accommodates the rear portion of the electric circuit interrupting device 60 in the vehicle longitudinal direction inside. The flange portion 74 is formed in a substantially C shape in plan view such that the front side of the flange portion 74 in the vehicle longitudinal direction is open, and is arranged along the outer peripheral portion around the service hole 32 so as to surround the rear side of the service hole 32 in the vehicle longitudinal direction over substantially half the circumference. The flange portion 74 is connected to the outer peripheral portion around the service hole 32 by welding.

The rear accommodating portion 76 of the rear cover 72 is formed in a semi-dome shape such that the lower side of the rear accommodating portion 76 in the vehicle vertical direction and the front side of the rear accommodating portion 76 in the vehicle longitudinal direction are open. The rear accommodating portion 76 includes a substantially flat upper wall portion 76A and a side peripheral wall portion 76B that is upright from the inner peripheral edge portion of the flange portion 74. A connecting bracket 80 is provided at the upper wall portion 76A of the rear accommodating portion 76. The connecting bracket 80 includes an insertion portion 82 and a guide portion 88. A connecting portion 118 of the front cover 102 (described later) is removably inserted to the insertion portion 82. The guide portion 88 guides the connecting portion 118 to an insertion port 84 (see FIG. 2) of the insertion portion 82.

The insertion portion 82 is formed in a substantially C shape in cross section such that a side adjacent to the upper wall portion 76A of the rear accommodating portion 76 is open. The insertion portion 82 constitutes a closed cross-sectional structure together with the upper wall portion 76A of the rear accommodating portion 76. The insertion port 84 (see FIG. 2) is formed at the front end side of the insertion portion 82 in the vehicle longitudinal direction, and the connecting portion 118 of the front cover 102 is inserted from the insertion port 84 into the insertion portion 82. In addition, a holding portion 82A that constitutes the upper wall portion of the insertion portion 82 is arranged so as to face the upper wall portion 76A of the rear accommodating portion 76, and holds the connecting portion 118, inserted from the insertion port 84, in cooperation with the upper wall portion 76A.

A rear fixing portion 86 is provided at the rear end portion of the insertion portion 82 in the vehicle longitudinal direction. The rear fixing portion 86 extends downward in the vehicle vertical direction along the side peripheral wall portion 76B of the rear accommodating portion 76, and is connected to the side peripheral wall portion 76B by welding. On the other hand, the guide portion 88 is provided at the front end portion of the insertion portion 82 in the vehicle longitudinal direction. The guide portion 88 is formed in a substantially C shape in cross section such that a side adjacent to the upper wall portion 76A of the rear accommodating portion 76 is open, and constitutes a closed cross-sectional structure together with the upper wall portion 76A of the rear accommodating portion 76. A guide opening 90 is formed at the front end side of the guide portion 88 in the vehicle longitudinal direction. The connecting portion 118 of the front cover 102 is inserted into the guide portion 88 through the guide opening 90.

As shown in FIG. 2, an upper guide wall portion 88A that constitutes the upper wall portion of the guide portion 88 extends forward in the vehicle longitudinal direction and upward in the vehicle longitudinal direction from the upper edge portion of the insertion port, 84 (the front end portion of the holding portion 82A in the vehicle longitudinal direction), and is bent downward in the vehicle vertical direction such that the distal end portion is substantially parallel to the upper wall portion 76A of the rear accommodating portion 76. In addition, a portion of the upper wall portion 76A of the rear accommodating portion 76 from the lower edge portion of the insertion port 84 to the front end portion of the upper wall portion 76A in the vehicle longitudinal direction serves as a lower guide wall portion 76A1 that guides the connecting portion 118 to the insertion port 84. The guide opening 90 is formed between these upper guide wall portion 88A and the lower guide wall portion 76A1. The guide opening 90 has a wider opening width (opening height) in the vehicle vertical direction than the insertion port 84. In addition, the lower guide wall portion 76A1 is extended more forward (by the length L) in the vehicle longitudinal direction than the upper guide wall portion 88A. The connecting portion 118 is guided to the guide opening 90 by the lower guide wall portion 76A1.

As shown in FIG. 3, side wall portions 88B of the guide portion 88 face each other in the vehicle width direction, and are inclined so as to be spaced apart from each other from the upper guide wall portion 88A toward the upper wall portion 76A of the rear accommodating portion 76. A front fixing portion 92 is provided at the lower end portion of each side wall portion 88B. The front fixing portion 92 extends outward of the guide portion 88. These front fixing portions 92 are connected to the upper wall portion 76A of the rear accommodating portion 76 by welding.

On the other hand, the front cover 102 includes a flange portion 104 and a front accommodating portion 106. The flange portion 104 is detachably connected to the floor panel 14. The front accommodating portion 106 is swelled upward in the vehicle vertical direction with respect to the flange portion 104, and accommodates the front portion of the electric circuit interrupting device 60 in the vehicle longitudinal direction inside. The flange portion 104 is formed in a substantially C shape in plan view such that the rear side of the flange portion 104 in the vehicle longitudinal direction is open. The flange portion 104 is arranged along the outer peripheral portion of the service hole 32 so as to surround the front side of the service hole 32 in the vehicle longitudinal direction over substantially half the circumference, and the rear end portion of the flange portion 104 in the vehicle longitudinal direction is superimposed on the front end portion of the flange portion 74 of the rear cover 72 in the vehicle longitudinal direction.

In addition, a mounting portion 104A to be mounted on the floor panel 14 is provided at the front end side of the flange portion 104 in the vehicle longitudinal direction. The mounting portion 104A is mounted on the floor panel 14 via a floor upper reinforcement (hereinafter, also simply referred to as "floor reinforcement") 108. The floor reinforcement 108 is arranged on the front side of the projecting portion 30 of the floor panel 14 in the vehicle longitudinal direction. That is, the flange portion 104 of the front cover 102 is arranged over the projecting portion 30 of the floor panel 14 and the floor reinforcement 108. Two mounting holes 110 are formed in the mounting portion 104A so as to be next to each other in the vehicle width direction. The mounting holes 110 extend through the mounting portion 104A in the thickness direction.

The floor reinforcement 108 is formed in a hat shape in cross section such that a side adjacent to the floor panel 14 is open, and is arranged in the vehicle width direction. The floor reinforcement 108 is connected to the floor panel 14 by welding. These floor reinforcement 108 and floor panel 14 constitute a closed cross-sectional structure.

In addition, an upper wall portion 108A of the floor reinforcement 108 is located at substantially the same level as the top wall portion 30A of the projecting portion 30 of the floor panel 14. The mounting portion 104A of the flange portion 104 of the front cover 102 is superimposed on the upper wall portion 108A. In addition, two mounting holes 112 are formed in the upper wall portion 108A of the floor reinforcement 108 so as to be next to each other in the longitudinal direction (vehicle width direction) of the floor reinforcement 108. The mounting holes 112 extend through the upper wall portion 108A in the thickness direction. By bolts 114 and nuts (not shown) that are inserted through these mounting holes 112 and the mounting holes 110 formed in the mounting portion 104A of the front cover 102, the mounting portion 104A of the front cover 102 is fixed to the floor panel 14 via the floor reinforcement 108. Note that the nuts (weld nuts) are arranged inside the floor reinforcement 108, and are welded to the upper wall portion 108A of the floor reinforcement 108.

The front accommodating portion 106 of the front cover 102 is formed in a semi-dome shape such that the lower side of the front accommodating portion 106 in the vehicle vertical direction and the rear side of the front accommodating portion 106 in the vehicle longitudinal direction are open. The front accommodating portion 106 includes a substantially flat upper wall portion 106A and a side peripheral wall portion 106B that is upright from the inner peripheral edge portion of the flange portion 104. The rear end portion of the upper wall portion 106A of the front accommodating portion 106 in the vehicle longitudinal direction is superimposed on the front end portion of the upper wall portion 76A of the rear accommodating portion 76 of the rear cover 72 in the vehicle longitudinal direction. A pair of cutout portions 116 are formed at the rear end portion of the front accommodating portion 106 so as to be spaced apart from each other in the vehicle width direction. The side wall portions 88B of the guide portion 88 provided on the rear cover 72 are respectively inserted in the cutout portions 116. The insertion portion 82 provided on the rear cover 72 and the connecting portion 118 that is inserted to the guide portion 88 removably in the vehicle longitudinal direction are provided between these cutout portions 116.

The connecting portion 118 is formed in a substantially rectangular sheet shape in plan view, and the width (the length in the vehicle width direction) of the connecting portion 118 is slightly narrower than the width of the insertion portion 82 and the width of the guide portion 88. In a state where the connecting portion 118 is inserted in the insertion portion 82, the mounting portion 104A of the flange portion 104 is fixed by bolts 114 to the upper wall portion 108A of the floor reinforcement 108 provided on the floor panel 14.

Next, a method of attaching the service hole cover and a method of removing the service hole cover in the present embodiment will be described, and the operation of the vehicle battery mounting structure according to the present embodiment will be described.

As shown in FIG. 3, the service hole cover 70 that closes the service hole 32 formed in the floor panel 14 includes the rear cover 72 and the front cover 102. The rear cover 72 covers the rear end 32R (see FIG. 2) side of the service hole 32. The front cover 102 covers the front end 32F side of the service hole 32. The flange portion 74 of the rear cover 72 is arranged along the outer peripheral portion of the service hole 32 so as to surround the rear side of the service hole 32 in the vehicle longitudinal direction over substantially half the circumference, and is connected to the outer peripheral portion around the service hole 32. The rear portion of the electric circuit interrupting device 60 is covered from above in the vehicle vertical direction with the rear accommodating portion 76 of the rear cover 72.

Figure 4A:
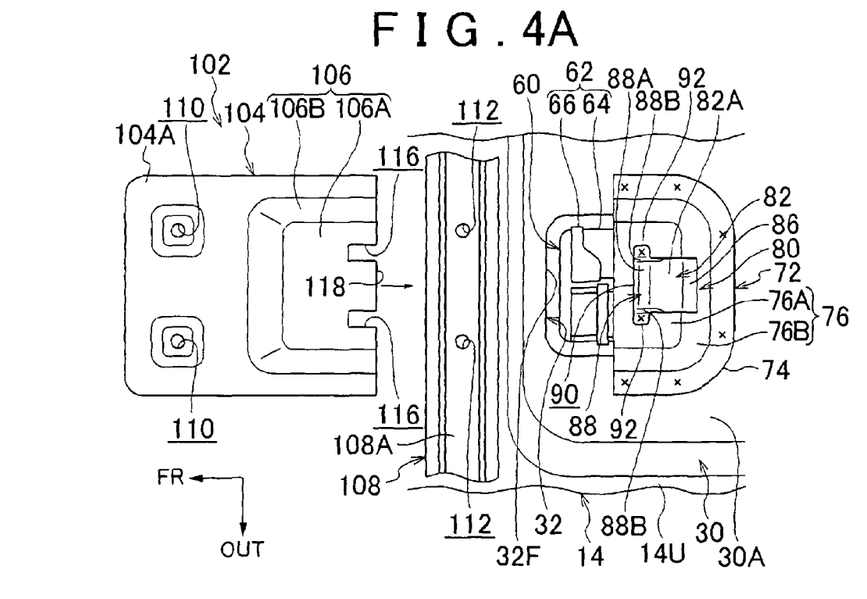
Figure 4B:
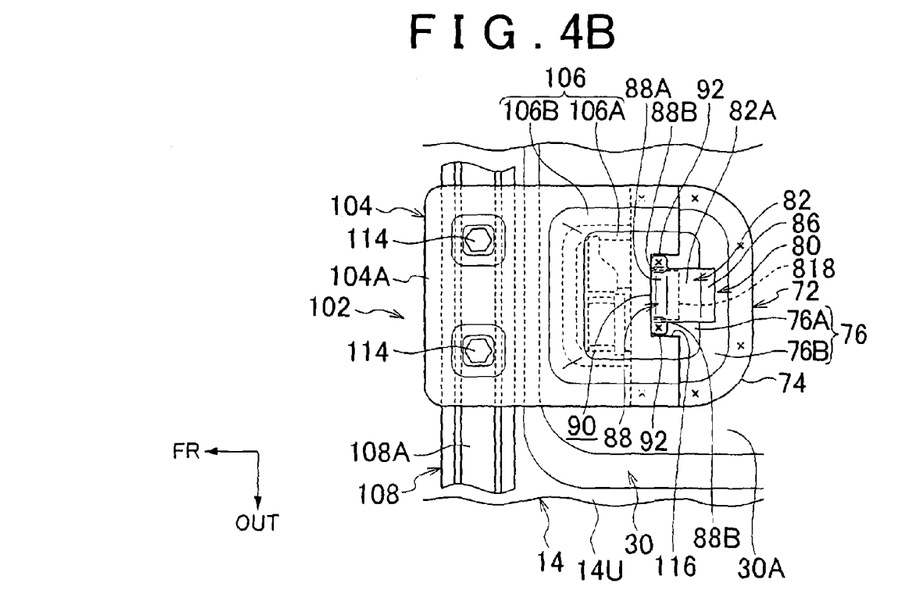

On the other hand, the front cover 102 is detachably attached to the floor panel 14 via the floor reinforcement 108. Specifically, as shown in FIG. 4A, in a state where the connecting portion 118 provided at the rear end portion of the front accommodating portion 106 in the vehicle longitudinal direction is oriented toward the guide opening 90 of the rear cover 72, the front cover 102 is slid rearward in the vehicle longitudinal direction along the top wall portion 30A of the projecting portion 30 of the floor panel 14 and the upper wall portion 108A of the floor reinforcement 108. Then, as shown in FIG. 4B, the rear end portions of the front accommodating portion 106 and flange portion 104 of the front cover 102 in the vehicle longitudinal direction are superimposed on the front end portions of the rear accommodating portion 76 and flange portion 74 of the rear cover 72 in the vehicle longitudinal direction, and the connecting portion 118 of the front cover 102 is inserted into the insertion portion 82 via the guide opening 90 and insertion port 84 (see FIG. 2) of the rear cover 72. By so doing, the connecting portion 118 of the front cover 102 is held between the holding portion 82A of the insertion portion 82 of the rear cover 72 and the upper wall portion 76A of the rear accommodating portion 76 of the rear cover 72, and the front cover 102 is connected to the rear cover 72. In addition, the front portion of the electric circuit interrupting device 60 in the vehicle longitudinal direction and the front end 32F side of the service hole 32 are covered from above in the vehicle vertical direction with the front accommodating portion 106 of the front cover 102, and the service hole 32 is closed.

In this state, the mounting portion 104A of the flange portion 104 of the front cover 102 is fastened to the upper wall portion 108A of the floor reinforcement 108 by the bolts 114 and the nuts (not shown). By so doing, the front cover 102 is fixed to the floor panel 14.

On the other hand, when the front cover 102 is removed from the floor panel 14, first, as shown in FIG. 2, the front seat 20 (see FIG. 1) is slid rearward in the vehicle longitudinal direction to expose the front cover 102 of the service hole cover 70. Subsequently, fastening of the mounting portion 104A of the flange portion 104 of the front cover 102 to the upper wall portion 108A of the floor reinforcement 108 by the bolts 114 is released. After that, the front cover 102 is slid forward in the vehicle longitudinal direction along the top wall portion 30A of the projecting portion 30 of the floor panel 14 and the upper wall portion 108A of the floor reinforcement 108 to pull out the connecting portion 118 of the front cover 102 from the insertion portion 82 of the rear cover 72. By so doing, the front cover 102 is removed from the floor panel 14, and the operating lever 66 of the service plug 62 arranged at the front end 32F side of the service hole 32 is exposed.

In this state, the worker slides the operating lever 66 inward in the vehicle width direction with respect to the plug case 64. By so doing, the plug terminal disengages from the connection terminal (not shown) accommodated in the plug case 64, and the electric circuit (not shown) of the battery module 42 is electrically interrupted.

In this way, in the present embodiment, by sliding the front seat 20 rearward in the vehicle longitudinal direction to expose the front cover 102 of the service hole cover 70, it is possible to easily remove the front cover 102 from the floor panel 14 as compared with the case where the front cover 102 is not exposed. Thus, workability of work for removing the front cover 102 improves.

In addition, by removing the front cover 102 from the floor panel 14, it is possible to open the service hole 32 in a state where the seat cushion 22 of the front seat 20 is located over the rear cover 72 in plan view, that is, in a state where the rear cover 72 is located below the seat cushion 22. Thus, in comparison with the case where the whole of the service hole cover 70 is exposed, it is possible to reduce the amount of slide of the front seat 20 rearward in the vehicle longitudinal direction. That is, with the vehicle battery mounting structure 10 according to the present embodiment, it is possible to reduce the amount of slide of the front seat 20 rearward in the vehicle longitudinal direction while improving workability of work for removing the rear cover 72.

In addition, in the present embodiment, as described above, the front cover 102 is slid rearward in the vehicle longitudinal direction along the top wall portion 30A of the projecting portion 30 of the floor panel 14 and the upper wall portion 108A of the floor reinforcement 108, and the connecting portion 118 of the front cover 102 is inserted into the insertion portion 82 of the rear cover 72. By so doing, the front cover 102 is connected to the rear cover 72. Thus, a positional deviation (relative displacement) in the vehicle vertical direction between the front cover 102 and the rear cover 72 is suppressed.

On the other hand, the front cover 102 is moved forward in the vehicle longitudinal direction with respect to the rear cover 72, and the connecting portion 118 of the front cover 102 is pulled out from the insertion portion 82 of the rear cover 72. By so doing, connection between the rear cover 72 and the front cover 102 is released. Thus, for example, in comparison with the configuration that the rear cover 72 and the front cover 102 are fastened to each other by a bolt, or the like, it is possible to easily connect the rear cover 72 and the front cover 102 to each other while suppressing a positional deviation between the rear cover 72 and the front cover 102 or easily release the connection.

Furthermore, for example, in the configuration that the rear cover 72 and the front cover 102 are fastened to each other by a bolt, or the like, when the bolt, or the like, is located below the seat cushion 22, it is difficult to operate the bolt, or the like. In contrast to this, in the present embodiment, the front cover 102 is slid in the vehicle longitudinal direction to connect the rear cover 72 and the front cover 102 to each other or release the connection. Therefore, even when the connecting portion 118 and the insertion portion 82 are located below the seat cushion 22, it is possible to easily connect the rear cover 72 and the front cover 102 to each other or easily release the connection.

Furthermore, the rear cover 72 having the insertion portion 82 includes the guide portion 88 that guides the connecting portion 118 of the front cover 102 to the insertion port 84 (see FIG. 2) of the insertion portion 82. As shown in FIG. 2, the upper guide wall portion 88A of the guide portion 88 is extended forward in the vehicle longitudinal direction and upward in the vehicle longitudinal direction from the upper edge portion of the insertion port 84. By so doing, the guide opening 90 having a wider opening width in the vehicle vertical direction than the insertion port 84 is formed between the upper guide wall portion 88A and the lower guide wall portion 76A1. A positional deviation of the connecting portion 118 upward in the vehicle vertical direction with respect to the insertion port 84 is absorbed by the upper guide wall portion 88A. Thus, in comparison with the configuration having no guide portion 88, it is possible to easily insert the connecting portion 118 to the insertion portion 82. Furthermore, the lower guide wall portion 76A1 is extended more forward in the vehicle longitudinal direction (by the length L) than the upper guide wall portion 88A. The connecting portion 118 is guided by the lower guide wall portion 76A1 to the guide opening 90 and the insertion port 84, so it is further easy to insert the connecting portion 118 to the insertion portion 82.

In addition, in the present embodiment, the operating lever 66 of the service plug 62 is located closer to the vehicle cabin 34 (upward in the vehicle vertical direction) than the floor panel 14. Thus, when the front cover 102 is removed from the floor panel 14, the operating lever 66 is exposed above the floor panel 14. In addition, the operating lever 66 is located at the front end 32F side of the service hole 32. Thus, in comparison with the configuration that the operating lever 66 is arranged below the floor panel 14 in the vehicle vertical direction, it is easy to operate the operating lever 66.

In addition, the inner weather strip 50 is provided in the gap between the top wall portion 46A of the battery case 44 and the floor panel 14 so as to surround the service hole 32, and the gap between the top wall portion 46A of the battery case 44 and the floor panel 14 is closed by the inner weather strip 50. Thus, entry of rain water, or the like, to the service hole 32 side is suppressed, so a failure, or the like, of the service plug 62 is suppressed.

Furthermore, as described above, in the present embodiment, the operating lever 66 of the service plug 62 is located closer to the vehicle cabin 34 (upward in the vehicle vertical direction) than the floor panel 14. Thus, if the inner weather strip 50 fails, the service plug 62 is prevented from getting wet due to rain water, or the like.

In addition, the inner weather strip 50 is arranged so as to be spaced apart from the base portion 48 that supports the electric circuit interrupting device 60, and the reservoir space 52 is formed between these inner weather strip 50 and the base portion 48. By so doing, if rain water, or the like, enters the vehicle cabin 34, rain water, or the like, flows into the reservoir space 52, so the service plug 62 is prevented from getting wet due to rain water, or the like.

Furthermore, the inner weather strip 50 is curved such that the distal end portion 50B1 of the inner weather strip 50 in the extending direction is oriented toward a side opposite to the service hole 32 and the base portion 48. By so doing, in comparison with the configuration that the distal end portion 50B1 of the inner weather strip 50 in the extending direction is not curved, it is possible to widen the reservoir space 52 while suppressing rain water, or the like, that enters toward the service hole 32 side through the gap between the floor panel 14 and the top wall portion 46A of the battery case 44. Thus, the capacity of rain water, or the like, storable in the reservoir space 52 increases, so the electric circuit interrupting device 60 is further prevented from being immersed in rain water, or the like.

In addition, in the present embodiment, the outer weather strip 54 is provided radially outward of the inner weather strip 50, and the double-seal structure is formed of these inner weather strip 50 and the outer weather strip 54. Thus, entry of rain water, or the like, toward the base portion 48 and the service hole 32 through the gap between the top wall portion 46A of the battery case 44 and the floor panel 14 is further suppressed.

Next, alternative embodiments of the service hole cover according to the embodiment will be described.

In the above-described embodiment, the rear cover 72 is fixed to the floor panel 14, and the front cover 102 is detachably attached to the floor panel 14; however, the configuration is not limited to this. For example, it is applicable that the front cover 102 that serves as the first cover is fixed to the floor panel 14 and the rear cover 72 that serves as the second cover is detachably attached to the floor panel 14, or it is applicable that the front cover 102 that serves as the first cover and the rear cover 72 that serves as the second cover are detachably attached to the floor panel 14.

Figure 5:
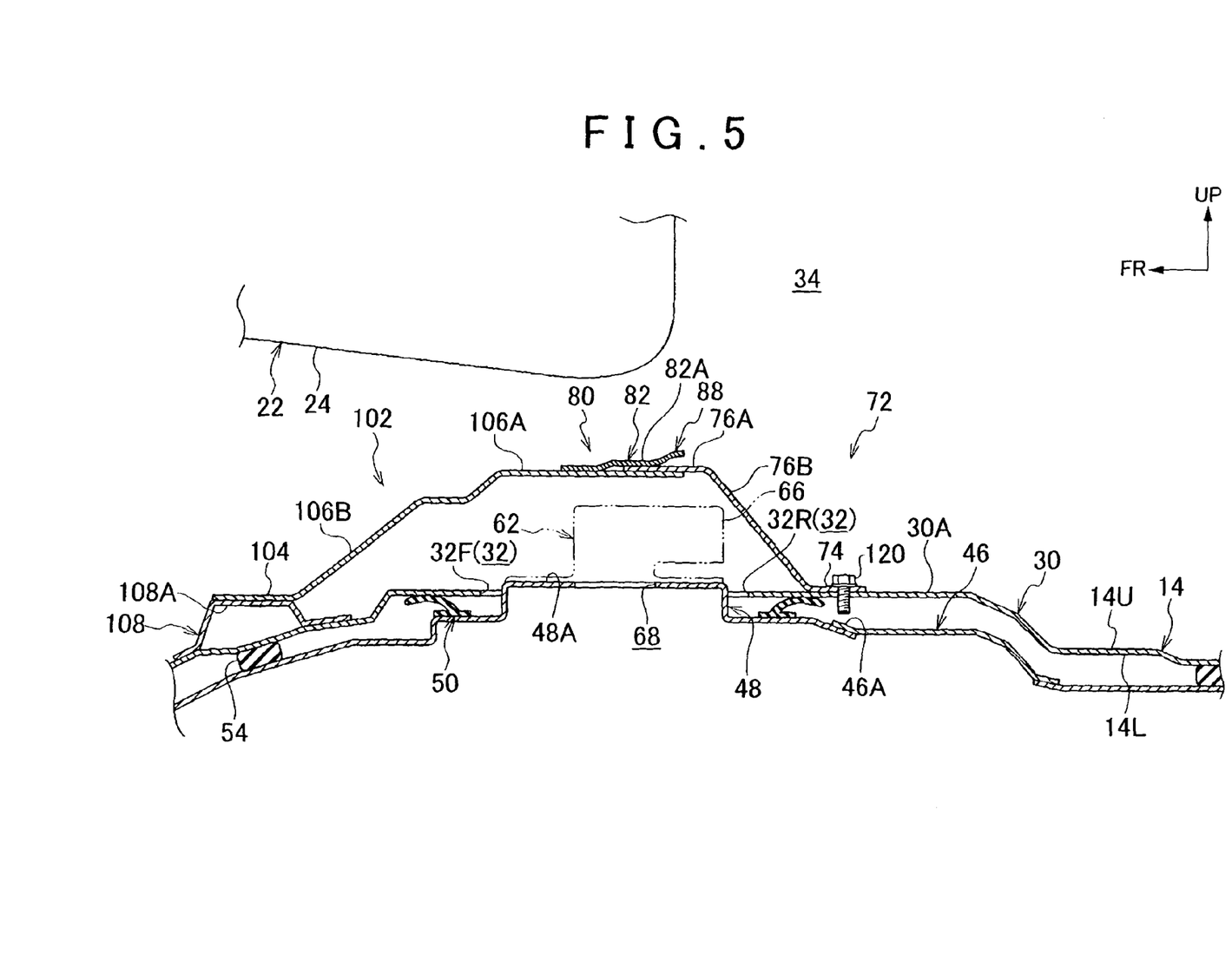
FIG. 5 is a cross-sectional view corresponding to FIG. 2, showing an alternative embodiment of the service hole cover according to the embodiment of the invention.

By way of example, in an alternative embodiment shown in FIG. 5, the flange portion 104 of the front cover 102 is connected to the floor upper reinforcement 108 by welding. On the other hand, the flange portion 74 of the rear cover 72 is fixed to the floor panel 14 by bolts 120, and is detachable from the floor panel 14. In this configuration, the rear cover 72 is slid forward in the vehicle longitudinal direction along the floor panel 14 to insert a connecting portion 122 of the rear cover 72 to the insertion portion 82 provided on the front cover 102. By so doing, the front cover 102 and the rear cover 72 are connected to each other. Conversely, the rear cover 72 is slid rearward in the vehicle longitudinal direction along the floor panel 14 to pull out the connecting portion 122 of the rear cover 72 from the insertion portion 82 of the front cover 102. By so doing, connection between the front cover 102 and the rear cover 72 is released. Note that, in the present embodiment, the operating lever 66 of the service plug 62 is arranged at the rear end 32R side of the service hole 32.

Thus, by sliding the front seat 20 (see FIG. 1) forward in the vehicle longitudinal direction to expose the rear cover 72 of the service hole cover 70, it is possible to improve workability of work for removing the rear cover 72. In addition, by removing the rear cover 72 from the floor panel 14, it is possible to open the service hole 32 in a state where the seat cushion 22 of the front seat 20 is located over the front cover 102. Thus, in comparison with the case where the whole of the service hole cover 70 is exposed, it is possible to reduce the amount of slide of the front seat 20 forward in the vehicle longitudinal direction.

In addition, in the above-described embodiment, the rear cover 72 has the insertion portion 82 and the front cover 102 has the connecting portion 118; conversely, it is applicable that the rear cover 72 has a connecting portion and the front cover 102 has an insertion portion and a guide portion.

Furthermore, in the above-described embodiment, the lower guide wall portion 76A1 is extended forward in the vehicle longitudinal direction (by the length L) with respect to the upper guide wall portion 88A; instead, the upper guide wall portion 88A may be extended forward in the vehicle longitudinal direction with respect to the lower guide wall portion 76A1, or the front end of the lower guide wall portion 76A1 in the vehicle longitudinal direction and the front end of the upper guide wall portion 88A in the vehicle longitudinal direction may be arranged at the same position. Furthermore, these upper guide wall portion 88A and the lower guide wall portion 76A1 may be omitted where appropriate.

In addition, in the above-described embodiment, the operating lever 66 of the service plug 62 is arranged above (vehicle cabin 34 side) the floor panel 14 in the vehicle vertical direction; instead, the operating lever 66 of the service plug 62 may be arranged below the floor panel 14 in the vehicle vertical direction.

In addition, in the above-described embodiment, the description is made on the example in which the service plug 62 serves as the operating portion of the battery unit 40; however, the operating portion is not limited to this. The operating portion of the battery unit 40 just needs to be configured to include an operable operating member, a replaceable consumable part, or the like, from the vehicle cabin 34 side through the service hole 32.

In addition, in the above-described embodiment, the description is made on the example in which the front seat 20 serves as the vehicle seat; instead, the vehicle seat may be, for example, a rear seat.

Note that the above-described embodiment includes the following technical ideas. That is, as described above, if the service plug 62 is located below the floor panel 14 in the vehicle vertical direction, when the inner weather strip 50 that closes the gap between the top wall portion 46A of the battery case 44 and the floor panel 14 fails, the service plug 62 may get wet due to rain water, or the like, to fail. As measures against this situation, the following mode is conceivable. For example, a vehicle battery mounting structure according to a first aspect includes: a vehicle floor in which a service hole is formed; a battery unit that has an operating portion arranged above the vehicle floor in a vehicle vertical direction through the service hole and arranged below the vehicle floor in the vehicle vertical direction; and a seal member that is provided in a gap between the vehicle floor and the battery unit so as to surround the service hole and that closes the gap.

By arranging the operating portion above the vehicle floor in the vehicle vertical direction through the service hole in this way, if the seal member fails, the operating portion is prevented from getting wet due to rain water, or the like. Thus, a failure, or the like, of the operating portion is suppressed.

In addition, in the vehicle battery mounting structure according to the first aspect, the battery unit includes a battery module that stores electric power; a battery case that accommodates the battery module; and a base portion that is provided at a top wall portion of the battery case, that protrudes upward in the vehicle vertical direction with respect to the vehicle floor through the service hole and that supports the operating portion, wherein the seal member is arranged radially outward of the base portion so as to be spaced apart from the base portion.

By arranging the seal member radially outward of the base portion so as to be spaced apart from the base portion in this way, even if rain water, or the like, enters onto the vehicle floor (into the vehicle cabin), rain water, or the like, flows into between the base portion and the seal member, so the operating portion is prevented from getting wet due to rain water, or the like. Thus, a failure, or the like, of the operating portion is suppressed.

Furthermore, in the vehicle battery mounting structure according to the above first or second aspect, the seal member extends from a top wall portion of the battery case toward the vehicle floor, and a distal end portion of the seal member in a direction in which the seal member extends is curved so as to be oriented toward a side opposite to the service hole.

By curving the distal end portion of the seal member in the direction in which the seal member extends such that the distal end portion is oriented toward a side opposite to the service hole in this way, in comparison with the configuration that the distal end portion of the seal member in the direction in which the seal member extends is not curved, it is possible to increase the capacity of rain water, or the like, storable between the base portion and the seal member while suppressing entry of rain water, or the like, to the service hole side through a gap between the vehicle floor and the top wall portion of the battery case. Thus, a failure, or the like, of the operating portion is further suppressed.

Note that in the first to third aspects, the service hole cover does not always need to be split into the front cover and the rear cover in a vehicle longitudinal direction, and various known service hole covers are applicable.

The embodiment of the invention is described above; however, the aspect of the invention is not limited to the above embodiment. The embodiment and various alternative embodiments may be used in combination with each other where appropriate, and, of course, the aspect of the invention may be implemented in various forms without departing from the scope of the invention.

The invention claimed is:

1. A vehicle battery mounting structure comprising:
a vehicle floor that supports a vehicle seat such that the vehicle seat is slidable in a vehicle longitudinal direction and in which a service hole is formed at a portion over which a seat cushion of the vehicle seat is located when the vehicle seat is located at a center in a sliding direction;
a battery unit that is arranged below the vehicle floor in a vehicle vertical direction and that has an operating portion protruding toward the service hole; and
a service hole cover that closes the service hole, and that includes a first cover that is provided on an upper face of the vehicle floor and that covers one end side of the service hole in the vehicle longitudinal direction and a second cover that is detachably attached to the upper face of the vehicle floor and that covers the other end side of the service hole in the vehicle longitudinal direction.

2. The vehicle battery mounting structure according to claim 1, wherein
the service hole cover includes an insertion portion that is provided at one of the first cover and the second cover and a connecting portion that is provided at the other one of the first cover and the second cover, that is inserted in the insertion portion removably in the vehicle longitudinal direction and that connects the first cover to the second cover.

3. The vehicle battery mounting structure according to claim 2, wherein
the insertion portion has an insertion port to which the connecting portion is inserted, and
the one of the first cover and the second cover, having the insertion portion, has a guide portion that guides the connecting portion to the insertion port.

4. The vehicle battery mounting structure according to claim 1, wherein
the operating portion is arranged above the vehicle floor through the service hole in a vehicle vertical direction.

5. The vehicle battery mounting structure according to claim 1, wherein
the battery unit includes a battery module that stores electric power and a battery case that accommodates the battery module and in which the operating portion is provided at a top wall portion of the battery case, and
a seal member that closes a gap between the vehicle floor and the top wall portion of the battery case is provided in the gap so as to surround the service hole.

6. The vehicle battery mounting structure according to claim 5, wherein
the battery unit is arranged below the vehicle floor in the vehicle vertical direction, the operating portion is arranged above the vehicle floor in the vehicle vertical direction through the service hole, and the seal member is arranged below the service hole in the vehicle vertical direction.

7. The vehicle battery mounting structure according to claim 5, wherein
the top wall portion of the battery case has a base portion that protrudes above the vehicle floor in the vehicle vertical direction with respect to the vehicle floor through the service hole and that supports the operating portion, and
the seal member is arranged radially outward of the base portion so as to be spaced apart from the base portion.

8. The vehicle battery mounting structure according to claim 5, wherein
the seal member extends from the top wall portion of the battery case toward the vehicle floor and is curved such that a distal end portion of the seal member in a direction in which the seal member extends is oriented toward a side opposite to the service hole.

* * * * *